(12) United States Patent
Valentine et al.

(10) Patent No.: US 7,061,423 B1
(45) Date of Patent: Jun. 13, 2006

(54) INTERLEAVED SWEEP FOR DETECTION OF POP TRANSMISSIONS IN POLICE RADAR DETECTORS

(75) Inventors: Michael David Valentine, Cincinnati, OH (US); Gary Edward Carrelli, Cincinnati, OH (US); Stephen Ray Scholl, Cincinnati, OH (US)

(73) Assignee: Valentine Research, Inc., Cincinnati, OH (US)

( * ) Notice: Subject to any disclaimer, the term of this patent is extended or adjusted under 35 U.S.C. 154(b) by 163 days.

(21) Appl. No.: 10/874,048

(22) Filed: Jun. 22, 2004

(51) Int. Cl.
  *G01S 7/40* (2006.01)
(52) U.S. Cl. ............... 342/20; 342/89; 342/100; 342/195
(58) Field of Classification Search ............... 342/20, 342/21, 89–94, 98–100, 115, 194–196
  See application file for complete search history.

(56) References Cited

U.S. PATENT DOCUMENTS

| | | | |
|---|---|---|---|
| 4,335,383 A * | 6/1982 | Berry | 342/115 |
| 4,630,054 A * | 12/1986 | Martinson | 342/20 |
| 4,862,175 A * | 8/1989 | Biggs et al. | 342/20 |
| 5,146,227 A | 9/1992 | Papadopoulos | |
| 5,315,302 A * | 5/1994 | Katsukura et al. | 342/20 |
| 5,900,832 A * | 5/1999 | Valentine et al. | 342/20 |
| 5,917,430 A * | 6/1999 | Greneker et al. | 340/905 |
| 5,917,441 A * | 6/1999 | Valentine et al. | 342/20 |
| 6,169,511 B1 * | 1/2001 | Iwakuni et al. | 342/20 |
| 6,175,324 B1 * | 1/2001 | Valentine et al. | 342/20 |
| 6,400,305 B1 * | 6/2002 | Kuhn | 342/20 |
| 6,400,309 B1 | 6/2002 | Jones | |
| 6,693,578 B1 * | 2/2004 | Martinson | 342/20 |
| 2004/0263378 A1 * | 12/2004 | Jossef et al. | 342/20 |

OTHER PUBLICATIONS

"Integrated X-band Sweeping Superheterodyne Receiver", Meier, P.J.; Okean, H.C.; Sard, E.W. Microwave Theory and Techniques, IEEE Transactions on Vol. 19, Issue 7, Jul. 1971 Ps: 600-609.*

"Swept-frequency techniques", Ely, P.C., Jr. Proceedings of the IEEE vol. 55, Issue 6, Jun. 1967 pp.: 991-1002.*

* cited by examiner

*Primary Examiner*—John B. Sotomayor
(74) *Attorney, Agent, or Firm*—Stevens & Showalter LLP

(57) ABSTRACT

In a police radar detector, a sweep signal defines at least one first sweep signal and at least one second sweep signal with the at least one second sweep signal being seamlessly inserted into the first sweep signal so that the first sweep signal is interrupted during the second sweep signal and restored after completion of the second sweep signal so that the first sweep signal can be continued. The frequencies swept by the at least one second sweep signal are thus overswept. By assigning the frequencies swept during the at least one first sweep to the radar bands of interest and the frequencies swept during the at least one second sweep to the frequencies used in the POP mode of operation by police radar, the short bursts of energy used in the POP mode can be detected.

22 Claims, 4 Drawing Sheets

INTERLEAVED SWEEP FOR DETECTION OF POP TRANSMISSIONS IN POLICE RADAR DETECTORS

BACKGROUND OF THE INVENTION

The present invention relates in general to police radar detectors and, more particularly, to police radar detectors and methods of operating police radar detectors so that one or more portions of a swept spectrum of frequencies are investigated multiple times during each sweep through the swept spectrum of frequencies.

Police have used radar systems to monitor the speed of motor vehicles for many years. The radar frequencies currently used throughout the world include: the X band –10.50 gigahertz (Ghz) to 10.55 Ghz; the Ku band –13.40 to 13.50 Ghz; the K band –24.05 Ghz to 24.25 Ghz; and the Ka band –33.40 Ghz to 36.00 Ghz. To alert motorists of the presence of police radar, electromagnetic signals within these radar bands are monitored using a police radar detector which issues an audible and/or visual alert upon detection of a radar signal within one of the bands.

As technological improvements are made in police radar speed measuring equipment to avoid their detection by radar detectors, improvements are made in police radar detectors so that the improved police radar can be detected. For example, to limit the effectiveness of radar detectors, police radar systems were improved to operate in both a continuous transmit mode and an intermittent transmit mode. In the intermittent transmit mode, the operator manually triggers the police radar dependent upon several conditions including, for example, the number of approaching vehicles or perhaps an initial visual determination of the speed of a single approaching vehicle.

While the intermittent mode of operating police radar systems initially reduced the ability of radar detectors to detect their presence in some instances, improvements were made to the detectors so that most newer radar detectors are effective even for intermittent police radar operation.

One of the most recent improvements in police radar to prevent existing radar detectors from detecting their radar transmissions is what is referred to as "POP" mode operation of the police radar. When police radar systems are in the POP mode, short bursts of energy are emitted so that vehicle speeds can be measured in less than a tenth of a second, i.e., less than 100 ms. The short bursts of energy are typically not detected by conventional radar detectors that require a signal to be stable over at least one sweep of the radar frequency bands of interest with each sweep taking more than a tenth of a second, for example, around 160 ms.

Radar detector manufacturers thus need to develop improvements to their radar detectors so that they can consistently and accurately detect police radar operating in the POP mode.

SUMMARY OF THE INVENTION

This need is met by the invention of the present application wherein a police radar detector comprises an antenna for receiving incoming electromagnetic signals and a local oscillator for generating a local oscillator signal that is swept through ranges of frequencies to sweep portions of police radar bands in response to a sweep signal. A mixer coupled to the antenna and the local oscillator mixes the Incoming electromagnetic signals with the local oscillator signal to generate intermediate frequency signals. Detector circuitry is coupled to the mixer for detecting received electromagnetic signals within the police radar bands. Signal conditioning and control circuitry generates the sweep signal to define at least one first sweep signal and at least one second sweep signal with the at least one second sweep signal being seamlessly inserted into the at least one first sweep signal so that the at least one first sweep signal is interrupted during the at least one second sweep signal and restored after completion of the at least one second sweep signal so that the at least one first sweep signal can be continued. The frequencies swept by the at least one second sweep signal are thus swept more than one time during each sweep cycle of the radar detector, i.e., the frequencies swept by the at least one second sweep signal are overswept. By assigning the frequencies swept during the at least one first sweep to the radar bands of interest and the frequencies swept during the at least one second sweep to the frequencies used in the POP mode of operation by police radar, the short bursts of energy used in the POP mode can be detected.

BRIEF DESCRIPTION OF THE DRAWINGS

The following detailed description of the preferred embodiments of the present invention can be best understood when read in conjunction with the following drawings in which.

DETAILED DESCRIPTION OF THE INVENTION

Figure 1:
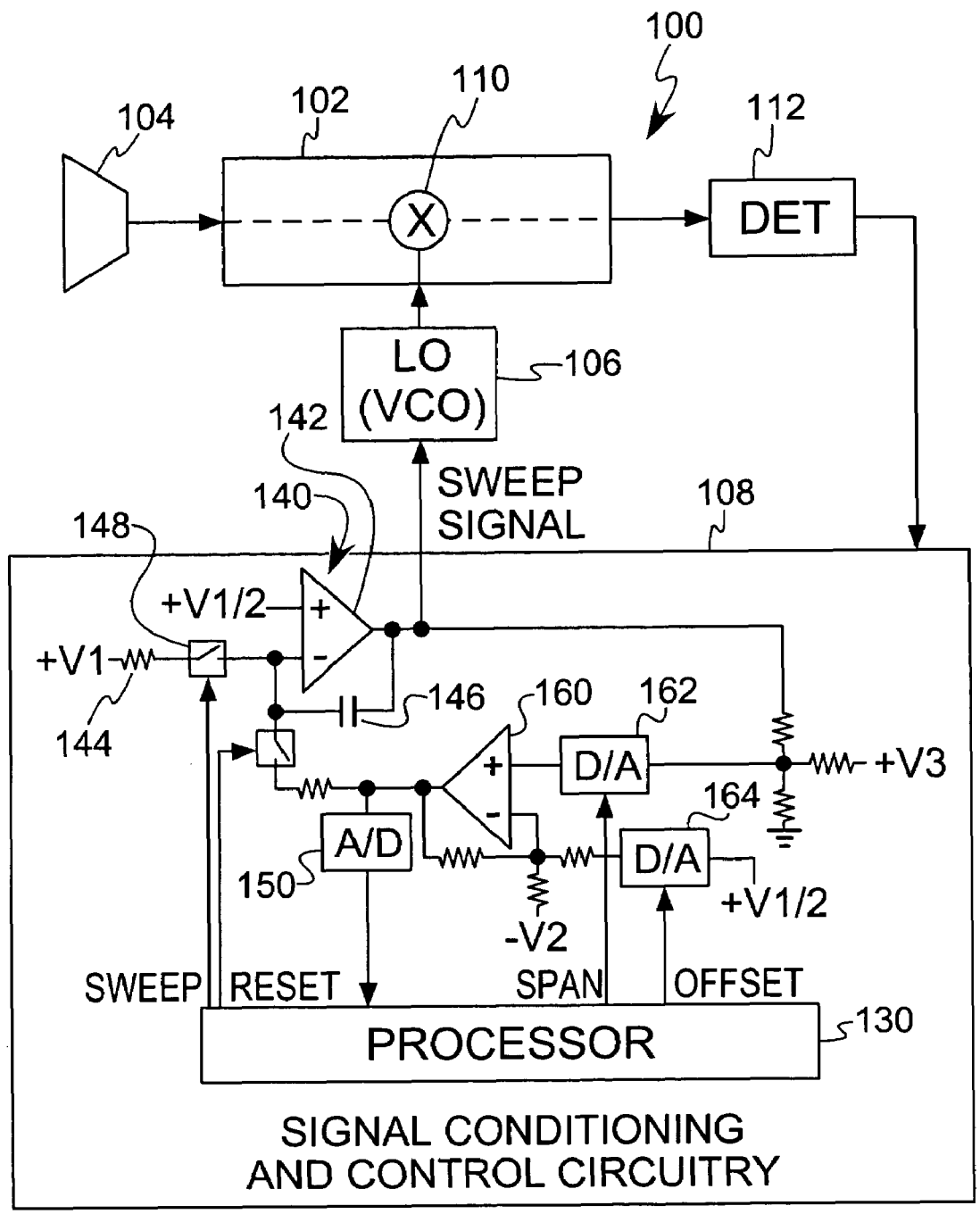
FIG. 1 is a schematic block diagram of a portion of a police radar detector configured to operate in accordance with the present invention.

Reference will now be made to FIG. 1 which illustrates a portion of a police radar detector 100 suitable for practicing the invention of the present application. The police radar detector 100 includes a single input stage 102; however, the invention is equally applicable for radar detectors having more than one input stage. For example, radar detectors having two input stages, one corresponding to a front channel and the other corresponding to a rear channel, are disclosed in U.S. Pat. No. 5,083,129 and U.S. Pat. No. 6,175,324, both of which are assigned to the same assignee as the present application and are incorporated herein by reference.

The radar detector 100 includes an antenna 104, such as a microwave horn, for receiving incoming electromagnetic signals. A local oscillator 106, a voltage controlled oscillator (VCO) as illustrated, generates a local oscillator signal that is swept through ranges of frequencies to sweep portions of police radar bands in response to a sweep signal passed to the local oscillator 106 from signal conditioning and control circuitry 108. A mixer 110 is coupled to the antenna 104 and the local oscillator 106 for mixing the incoming electromagnetic signals with the local oscillator signal to generate intermediate frequency signals. Detector circuitry 112 is coupled to the mixer 110 for detecting received electromagnetic signals of interest within the police radar bands. An example of detector circuitry is disclosed in U.S. Pat. No. 5,068,663, which is assigned to the same assignee as the present application and is incorporated herein by reference.

For operation of the radar detector 100 in accordance with the present invention, the signal conditioning and control circuitry 108 generates the sweep signal to define at least one first sweep signal and at least one second sweep signal with the at least one second sweep signal being seamlessly inserted into the at least one first sweep signal so that the at least one first sweep signal is interrupted during the at least one second sweep signal and restored after completion of the at least one second sweep signal to continue the at least one first sweep signal from where it was interrupted.

Figure 2:
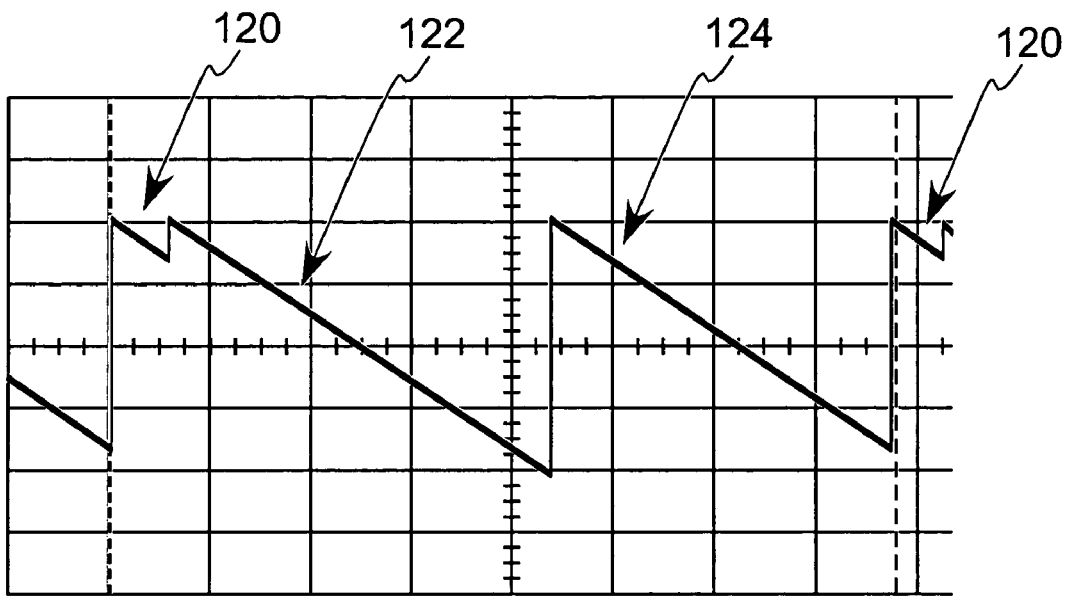
FIGS. 2 and 3 are sweep signal waveforms of a radar detector operating with the POP mode of operation of the present invention disabled with FIG. 2 showing a sweep cycle without detection of a police radar signal and FIG. 3 showing a sweep cycle with detection of a police radar signal.
Figure 3:
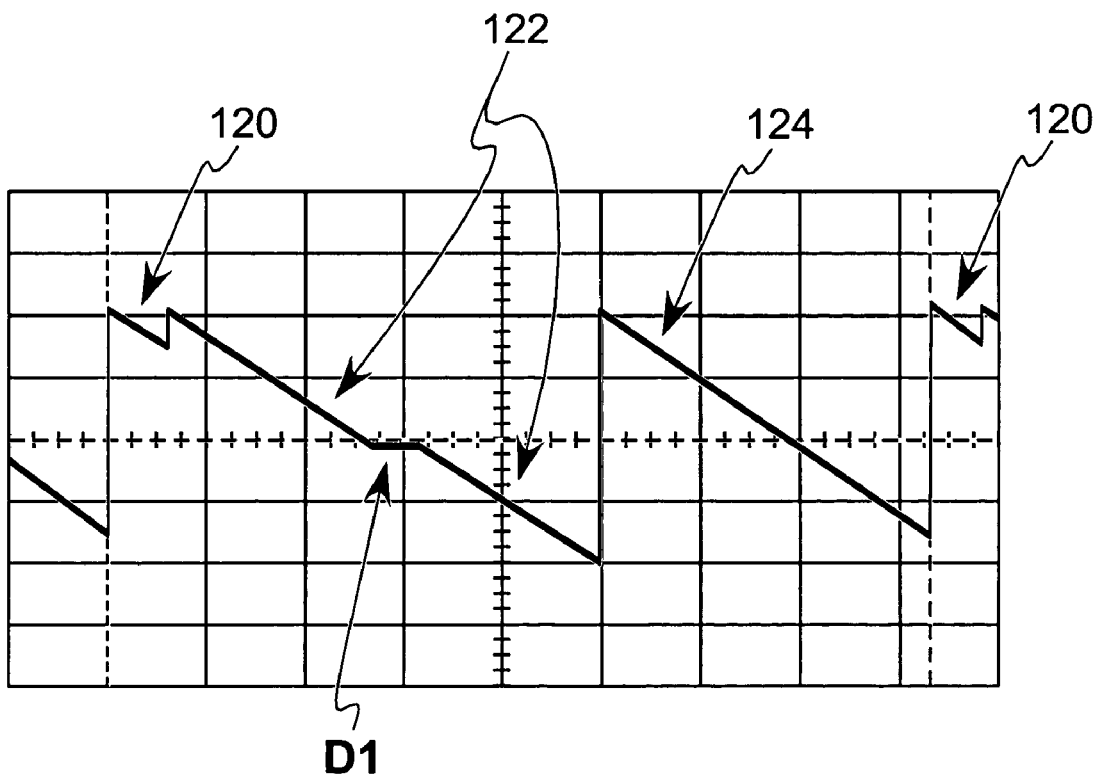
Figure 6:
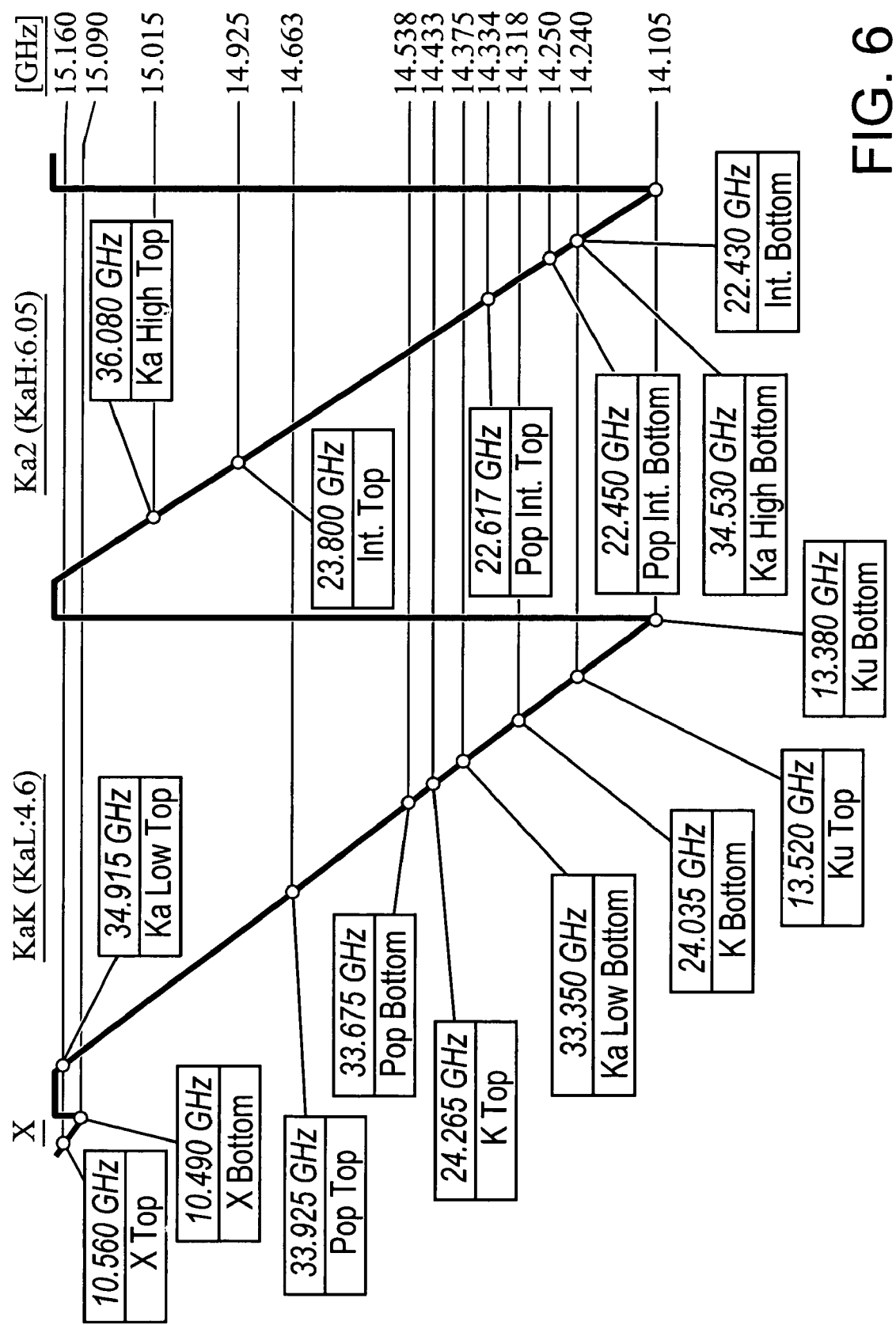
FIG. 6 is a graph showing the frequency sweep scheme for the radar detector of FIG. 1 including exemplary POP frequency bands and a POP frequency interference band.

FIGS. 2 and 3 show sweep cycles of the radar detector 100 with a POP mode of operation disabled using substantially the same frequency scheme as that taught in referenced U.S. Pat. No. 6,175,324. FIG. 2 shows frequency sweeping without detection of a police radar signal and FIG. 3 shows frequency sweeping with a police radar signal D1 being detected and processed during an interruption of the sweep. The X band is swept during a first portion 120 of the sweep cycle with the K, Ku and Ka bands being swept during second and third portions 122, 124 of the sweep cycle before the sweep cycle is repeated. See FIG. 6 for more detailed information regarding the frequency scheme for the radar detector 100 of the present application.

Figure 4:
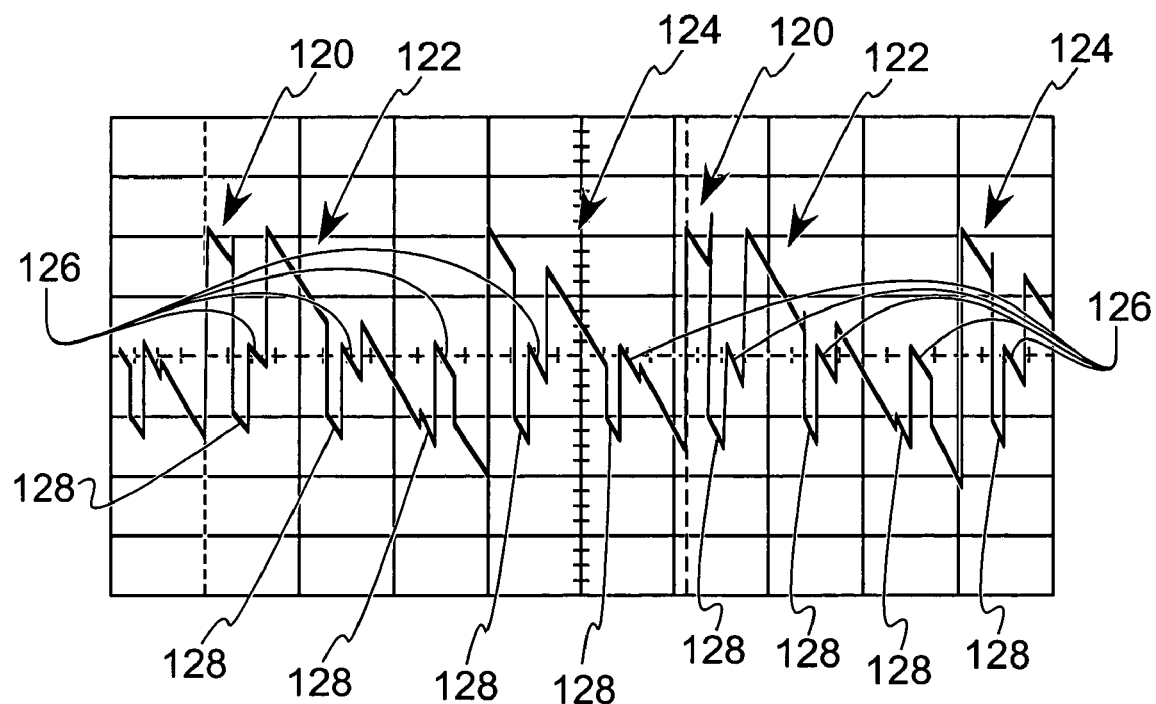
FIGS. 4 and 5 are sweep signal waveforms of a radar detector operating with one example of the POP mode of operation of the present invention enabled with FIG. 4 showing a sweep cycle without detection of a police radar signal and FIG. 5 showing a sweep cycle with detection of a police radar signal made during POP sweep portions of the sweep cycle.
Figure 5:
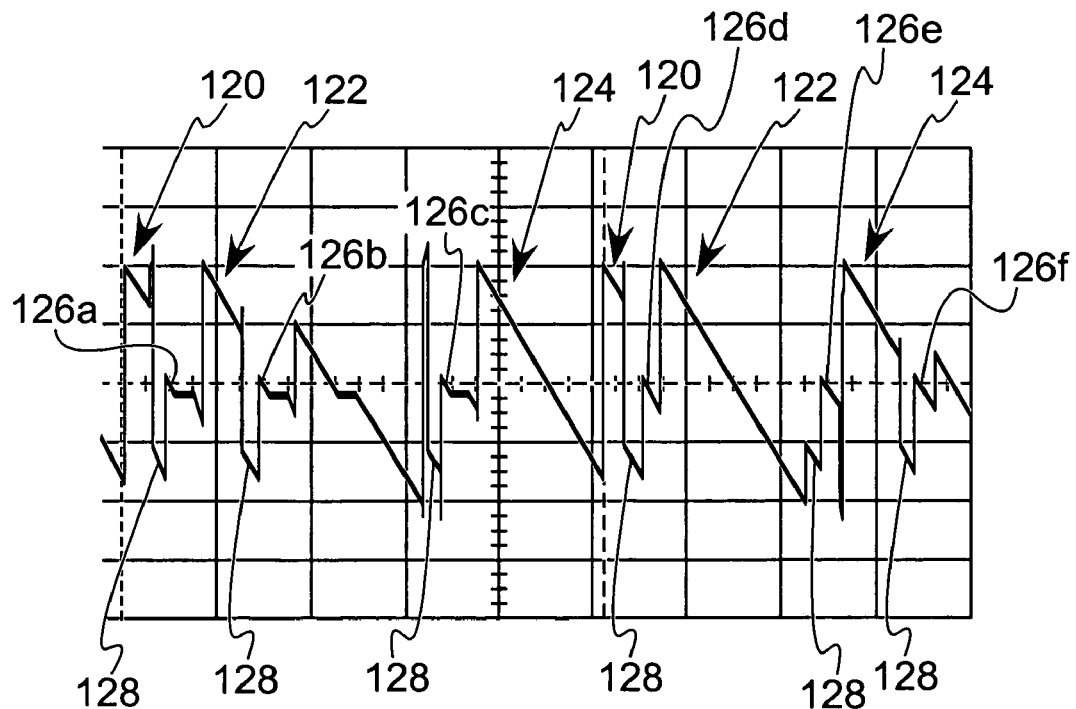

FIGS. 4 and 5 show sweep cycles of the radar detector 100 with an exemplary POP mode of operation of the invention of the present application enabled so that second sweep signals or POP sweep signals, are inserted into the portions 122 and 124 of the sweep cycles which sweep the K and Ka radar bands and an interference band which is swept to detect and suppress harmonic, i.e., "falsing", from other radar detector local oscillators. While second sweep signals also could be inserted into the first portion 120 of the sweep cycle for the X band and the second portion 122 of the sweep cycle for the Ku band, due to the small frequency ranges of the X and Ku band sweeps they are not currently used to reduce overall sweep cycle time.

To detect police radar operating in the POP mode, the at least one second sweep signal defines a sweep of a POP frequency band 126 which is seamlessly inserted into the at least one first sweep signal as it is sweeping a portion of one of the police radar bands, the K band, the Ka band and the interference band as illustrated. The at least one second sweep signal or POP sweep signal defines a sweep of a POP frequency band 126. As illustrated, the POP frequency band comprises the range of frequencies from about 33.675 Ghz to about 33.925 Ghz which lie within the Ka police radar frequency band. Additional ranges of frequencies, for example from about 24.05 Ghz to about 24.25 Ghz (the entire K band), can also be swept with the specific POP frequency band or bands being swept depending on the POP frequency bands used by police radars when operating in the POP mode. Thus, while one POP frequency band is illustrated, any reasonable number of POP frequency bands may be swept as required. Further, another second sweep signal may be generated to sweep a POP interference frequency band 128. For example, the POP interference frequency band may comprise the range of frequencies from about 22.450 Ghz to about 22.617 Ghz. The POP interference band is swept to detect and suppress the third harmonic, i.e., "falsing", from another radar detector using an 11 Ghz local oscillator. Due to the frequency scheme used in the present radar detector, the POP interference frequency band 128, when used, is swept before the POP frequency band 126. Of course, the POP interference band can be swept during the interference band sweep at the normal sweep rate to reduce the overall sweep cycle time of the radar detector 100.

The second sweep signals, i.e., the POP sweep signal(s) and optionally the POP interference sweep signal, are triggered by an asynchronous timer in a processor 130 of the radar detector 100, see FIG. 1, to maintain the sweep cycle time of the police radar detector at an approximately constant nominal value of 256 ms as illustrated with both the POP sweep and optional POP interference sweep. To that end, the asynchronous timer is preferably an adaptive timer that changes its time period based on the number of signal detections made during a second or POP sweep. More particularly, as illustrated the adaptive timer times for a period of about 50 ms when no signals are detected during a second sweep; times for a period of about 96 ms when one signal is detected during a second sweep; and, times for a period of about 150 ms when more than one signal is detected during a second sweep. Thus, as shown in FIG. 4, under normal sweeping conditions with no signal detected during a second or POP sweep, five (5) POP sweeps/POP interference sweeps are performed during a sweep cycle. Of course, other sweep cycle times and adaptive time periods can be used in the present invention as will be apparent to those skilled in the art.

In the illustrated embodiment, the time period of the adaptive timer is changed on the next trigger of a second sweep as can be seen in FIG. 5 where a signal is detected during the sweep of the POP frequency band 126a and the time period for the next trigger for the sweep of the POP frequency band 126b is kept the same, for example at 50 ms. At the trigger for the sweep of the POP frequency band 126b, the time period of the adaptive timer is increased, for example to 96 ms, due to the signal detection during POP frequency band 126a so that the time for the next trigger for the sweep of the POP frequency band 126c is set to a larger value, 96 ms as illustrated. Since the same signal is again detected during the POP frequency band 126c, the time to the next trigger remains the same so that the time for the next trigger signal for the sweep of the POP frequency band 126d is 96 ms as illustrated. Since no signal is detected during the sweep of the POP frequency band 126d, at the trigger for the sweep of the POP frequency band 126e, the time period of the adaptive timer is decreased back to 50 ms so that the time for the next trigger signal for the sweep of the POP frequency band 126f is once again 50 ms. Thus, the sweep cycle time as illustrated in FIG. 5 is maintained at about 257 ms. If more than one signal was detected during any of the sweeps of the POP frequency bands 126, the time period of the adaptive timer would be further increased, for example to about 150 ms, in the same manner as described for the detection of a single signal.

The sweeping operation of the present invention, for example as illustrated in FIGS. 4 and 5, provides an "oversweeping" which increases the raw sensitivity of the radar detector 100 in addition to enhancing the response time for signals found in the portions of the police radar frequency bands that are overswept, e.g., the POP frequencies.

The circuitry for generating the sweep signal will now be described with reference to FIG. 1. The police radar detector 100 uses an integrator 140 to generate a linear voltage ramp for sweep tuning of the VCO defining the local oscillator 106 in the illustrated embodiment. The integrator 140 comprises an operational amplifier (op amp) 142, a resistor 144 and a capacitor 146. The non-inverting input of the op amp 142 is biased at approximately half of the voltage V1 applied to the inverting input of the op amp 142, through the resistor 144 and an analog sweep enable switch 148, to facilitate more symmetrical performance when the integrator voltage is abruptly forced to either a higher voltage or a lower voltage as required for jumping to a second sweep or POP/POP interference sweep and/or for jumping back to a first sweep into which the second sweep or POP/POP interference sweep was inserted. To adjust the amplitude (span) and offset of the sweep ramp, initialize the starting voltage of the ramp, and scale and offset the ramp waveform so that it can utilize the full dynamic range of an analog-to-digital (A/D) converter 150, an operational amplifier (op amp) 160 has its non-inverting input connected to a SPAN digital-to-analog (D/A) converter 162 and the voltage on its inverting input connected to an OFFSET D/A converter 164.

To abruptly modify the tuning voltage for the VCO defining the local oscillator 106, the OFFSET D/A converter 164 is loaded with the appropriate value to force the output of the integrator 140 to the target voltage and the RESET line is enabled for a few microseconds to allow circuit settling. The reset line is then opened and the OFFSET D/A converter 164 is restored with its original offset value to restore the offset contributions for the op amp 160 so that the sweep output maps to the A/D converter 150 input with the specified gain and offset.

While operation of the radar detector 100 should be apparent from a review of the forgoing description, to ensure clarity, methods of operation will be described. In one aspect of the invention, a method for operating a police radar detector comprises receiving incoming electromagnetic signals and mixing those signals with a local oscillator signal that is swept through ranges of frequencies to sweep portions of police radar bands in response to a sweep signal. Received electromagnetic signals are detected within the police radar bands with the sweep signal defining at least one first sweep signal and at least one second sweep signal, with the at least one second sweep signal being seamlessly inserted into the at least one first sweep signal so that the at least one first sweep signal is interrupted during the at least one second sweep signal and restored after completion of the at least one second sweep signal to continue the at least one first sweep signal. For detecting police radar operating in the POP mode, the at least one second sweep signal corresponds to a POP frequency band. Optionally, the at least one second sweep signal may further correspond to a POP frequency interference band.

The method may further comprise asynchronously triggering the at least one second sweep signal to maintain a sweep time of the police radar detector at an approximately constant value. To that end, asynchronously triggering the at least one second sweep signal may comprise adaptively triggering the at least one second sweep signal to change its time period based on the number of signal detections made during the second sweep.

In another aspect of the present invention, a method for operating a police radar detector comprises receiving incoming electromagnetic signals, mixing the incoming signals with a local oscillator signal to generate intermediate frequency signals and detecting received electromagnetic signals. The local oscillator signal is swept for detection of received electromagnetic signals within a police radar band and portions of a police radar band are overswept during sweeping of the local oscillator signal. To detect police radar operating in the POP mode, oversweeping portions of a police radar band may comprise oversweeping a POP frequency band and, optionally, oversweeping portions of a POP frequency interference band. Sweeping the local oscillator may comprise generating a sweep signal to sweep the police radar band and oversweeping portions of a police radar band may comprise generating an oversweep signal and seamlessly inserting the oversweep signal into the sweep signal. This insertion may comprise interrupting the sweep signal, inserting the oversweep signal and restoring the sweep signal upon completion of the oversweep signal.

In yet another aspect of the present invention, a method for operating a police radar detector comprises receiving incoming electromagnetic signals and mixing those signals with a local oscillator signal that is swept through ranges of frequencies to sweep portions of police radar bands in response to a sweep signal so that electromagnetic signals within the police radar bands are detected. The sweep signal is generated to define a first sweep signal and a second oversweep signal, the second oversweep signal being seamlessly inserted into the first sweep signal so that the first sweep signal is interrupted during the second oversweep signal and restored after completion of the second oversweep signal to continue the first sweep signal.

Having described the invention in detail and by reference to preferred embodiments thereof, it will be apparent that modifications and variations are possible without departing from the scope of the invention defined in the appended claims.

What is claimed is:

1. A police radar detector comprising:
   an antenna for receiving incoming electromagnetic signals;
   a local oscillator for generating a local oscillator signal that is swept through ranges of frequencies to sweep portions of police radar bands in response to a sweep signal;
   a mixer coupled to said antenna and said local oscillator for mixing said incoming electromagnetic signals with said local oscillator signal to generate intermediate frequency signals;
   detector circuitry coupled to said mixer for detecting received electromagnetic signals within said police radar bands; and
   signal conditioning and control circuitry for generating said sweep signal to define at least one first sweep signal and at least one second sweep signal, said at least one second sweep signal being seamlessly inserted into said at least one first sweep signal so that said at least one first sweep signal is interrupted during said at least one second sweep signal and restored after completion of said at least one second sweep signal to continue said at least one first sweep signal.

2. A police radar detector as claimed in claim 1 wherein said at least one first sweep signal defines a sweep portion of one of said police radar bands and said at least one second sweep signal defines a sweep of a POP frequency band.

3. A police radar detector as claimed in claim 2 wherein said POP frequency band comprises the range of frequencies from about 33.675 Ghz to about 33.925 Ghz.

4. A police radar detector as claimed in claim 2 wherein said POP frequency band comprises the K band.

5. A police radar detector as claimed in claim 2 wherein said at least one second sweep signal further defines a sweep of a POP interference frequency band.

6. A police radar detector as claimed in claim 5 wherein said POP interference frequency band comprises the range of frequencies from about 22.450 Ghz to about 22.617 Ghz.

7. A police radar detector as claimed in claim 1 wherein said signal conditioning and control circuitry comprises an integrator circuit having an operational amplifier biased at approximately the midpoint of its voltage range to facilitate symmetrical performance during integrator voltage changes for transitions between said at least one first sweep signal and said at least one second sweep signal.

8. A police radar detector as claimed in claim 1 wherein said at least one second sweep signal is triggered by an asynchronous timer to maintain a sweep time of the police radar detector at an approximately constant value.

9. A police radar detector as claimed in claim 8 wherein said asynchronous timer is an adaptive timer that changes its time period based on a number of signal detections made during said second sweep.

10. A police radar detector as claimed in claim 9 wherein said adaptive timer times proportionately with the number of signal detections made during said second sweep.

11. A police radar detector as claimed in claim 9 wherein said adaptive timer times for about 50 ms with 0 signal detections, times for about 96 ms with 1 signal detection, and times for about 150 ms with 1 or more signal detections.

12. A method for operating a police radar detector comprising:
    receiving incoming electromagnetic signals;
    generating a local oscillator signal that is swept through ranges of frequencies to sweep portions of police radar bands in response to a sweep signal;
    mixing said incoming electromagnetic signals with said first oscillator signal to generate intermediate frequency signals;
    detecting received electromagnetic signals within said police radar bands; and
    generating said sweep signal to define at least one first sweep signal and at least one second sweep signal, said at least one second sweep signal being seamlessly inserted into said at least one first sweep signal so that said at least one first sweep signal is interrupted during said at least one second sweep signal and restored after completion of said at least one second sweep signal to continue said at least one first sweep signal.

13. The method as claimed in claim 12 further comprising defining said at least one second sweep signal to correspond to a POP frequency band.

14. The method as claimed in claim 13 further comprising defining said at least one second sweep signal to correspond to a POP frequency interference band.

15. The method as claimed in claim 12 further comprising asynchronously triggering said at least one second sweep signal to maintain a sweep time of the police radar detector at an approximately constant value.

16. The method as claimed in claim 15 wherein asynchronously triggering said at least one second sweep signal comprises adaptively triggering said at least one second sweep signal to change its time period based on a number of signal detections made during said second sweep.

17. A method for operating a police radar detector comprising:
    receiving incoming electromagnetic signals;
    mixing said incoming signals with a local oscillator signal to generate intermediate frequency signals;
    detecting received electromagnetic signals;
    sweeping said local oscillator signal for detection of received electromagnetic signals within a police radar band; and
    oversweeping portions of a police radar band during sweeping of said local oscillator signal.

18. The method of claim 17 wherein oversweeping portions of a police radar band comprises oversweeping a POP frequency band.

19. The method of claim 18 wherein oversweeping portions of a police radar band further comprises oversweeping a POP frequency interference band.

20. The method of claim 17 wherein sweeping said local oscillator comprises generating a sweep signal to sweep said police radar band and oversweeping portions of a police radar band comprises:
    generating an oversweep signal; and
    seamlessly inserting said oversweep signal into said sweep signal.

21. The method of claim 20 wherein seamlessly inserting said oversweep signal into said sweep signal comprises:
    interrupting said sweep signal;
    inserting said oversweep signal; and
    restoring said sweep signal upon completion of said oversweep signal.

22. A method for operating a police radar detector comprising:
    receiving incoming electromagnetic signals;
    generating a local oscillator signal that is swept through ranges of frequencies to sweep portions of police radar bands in response to a sweep signal;
    mixing said incoming electromagnetic signals with said first oscillator signal to generate intermediate frequency signals;
    detecting received electromagnetic signals within said police radar bands; and
    generating said sweep signal to define a first sweep signal and a second oversweep signal, said second oversweep signal being seamlessly inserted into said first sweep signal so that said first sweep signal is interrupted during said second oversweep signal and restored after completion of said second oversweep signal to continue said first sweep signal.

* * * * *